United States Patent [19]

Kamiya

[11] Patent Number: 4,858,216
[45] Date of Patent: Aug. 15, 1989

[54] OPTICAL PICKUP CONTROL DEVICE

[75] Inventor: Shingo Kamiya, Hamamatsu, Japan

[73] Assignee: Yamaha Corporation, Hamamatsu, Japan

[21] Appl. No.: 51,863

[22] Filed: May 18, 1987

[30] Foreign Application Priority Data

May 19, 1986 [JP] Japan .................. 61-114090

[51] Int. Cl.$^4$ .................. G11B 7/00
[52] U.S. Cl. .................. 369/46
[58] Field of Search .................. 369/32, 44, 45, 46; 250/201

[56] References Cited

U.S. PATENT DOCUMENTS

| 4,467,462 | 8/1984 | Shibata | 369/46 |
| 4,544,838 | 10/1985 | Musha et al. | 369/46 |
| 4,744,069 | 5/1988 | Sugiyama et al. | 369/32 |

*Primary Examiner*—Donald McElheny, Jr.
*Attorney, Agent, or Firm*—Spensley Horn Jubas & Lubitz

[57] ABSTRACT

An optical pickup control device receives a laser beam reflected from a disc pit with a four split photo-detector and performs a tracking servo in response to two diagonal sum outputs of this four split photo-detector. The device comprises a neutral position control circuit which receives a left adjacent sum output and a right adjacent sum output of the four split photo-detector and, in response to these adjacent sum outputs, controls a neutral position of an objective lens so that these adjacent sum outputs become equal to each other. In an embodiment of the invention, the neutral position control circuit servo-controls a feed motor of the optical pickup with a difference signal between the left and right adjacent sum outputs. The device effectively corrects deviation of a beam spot from a center of the four split photo-detector and thereby improves the quality of a tracking error signal.

7 Claims, 3 Drawing Sheets

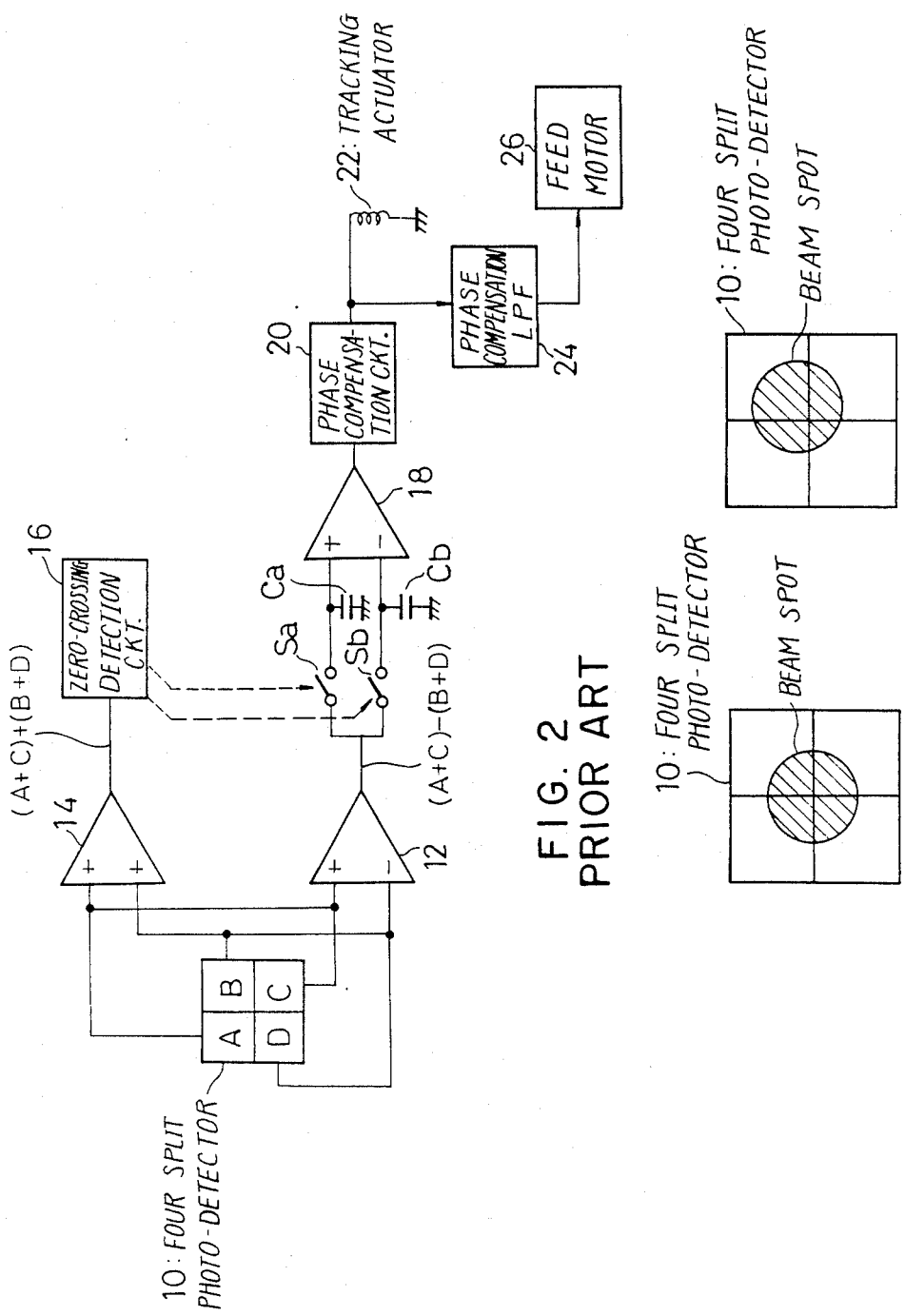

OPTICAL PICKUP CONTROL DEVICE

BACKGROUND OF THE INVENTION

This invention relates to a device for controlling an optical pickup and, more particularly, to a device for controlling an optical pickup of one-beam system using a four-split photo-detector capable of eliminating deviation of a beam spot on the photo-detector due to aging of an objective lens support system or other causes and thereby positioning a neutral point of the beam spot constantly at the center of the photodetector.

An optical pickup of one-beam system using a four-split photo-detector is used for detection of an RF signal and various servo controls including focusing servo and servo controls in the radial direction (i.e., tracking servo and feed servo) in a playback device for playing back optical discs such as a Compact Disc for the Compact Disc Digital Audio System and a video disc.

As a prior art radial direction control circuit using a four-split photo-detector, a circuit using a heterodyne system for tracking error detection is shown in FIG. 2. In a four-split photo-detector 10 (PPD, i.e., pin photodiode), signals representing received laser beam on respective diagonals are added together. Sum signals A+C and B+D are subject to subtraction by a subtraction circuit 12 to produce a signal (A+C) −(B+D). These sum signals are also added together by an addition circuit 14 to produce a signal (A+C)+(B+D).

The output of the subtraction circuit 12 is zero when there is no tracking error and, when there is a tracking error, precedes or delays in phase by 90 degrees with respect to the output of the addition circuit 14, i.e., RF output, in accordance with the direction of the error (the level of the output of the subtraction circuit 12 also changes in accordance with the magnitude of the tracking error). A zero-crossing detection circuit 16 detects zero-crossing of the output of the addition circuit 14. At zero-crossing in rising of the output of the addition circuit 14, the circuit 16 momently turns on a switch Sa among switches Sa and Sb to which the output of the subtraction circuit 12 is provided thereby causing the output of the subtraction circuit 12 at that moment to be sampled at a capacitor Ca. At zero-crossing in falling of the output of the addition circuit 14, the zero-crossing detection circuit 16 momently turns on the switch Sb thereby causing the output of the subtraction circuit 12 at that moment to be sampled at a capacitor Cb. Since, as described above, the output of the subtraction circuit 12 precedes or delays in its phase by 90 degrees with respect to the ouput of the addition circuit 14 in accordance with the direction of tracking error, polarities of the sampled values in the capacitors Ca and Cb are of opposite polarities to each other. The sampled values in the capacitors Ca and Cb are applied respectively to a − input and a+ input of a differential amplifier 18 and, accordingly, a tracking error signal of a level corresponding to the magnitude of the tracking error and of a polarity corresponding to the tracking error direction is provided from the differential amplifier 18.

The tracking error signal is supplied to a tracking actuator 22 through a phase compensation circuit 20 to drive the objective lens in the radial direction of the disc. The tracking error signal is also supplied to a phase-compensation and low-pass filter circuit 24 in which a low frequency component, i.e., a dc component, of the tracking error signal is extracted. This dc component is supplied to a feed motor 26 to drive the entire optical pickup in the radial direction of the disc so as to reduce the dc component to zero.

The objective lens of the optical pickup is adjusted in the manufacturing process in such a manner that, when the tracking servo is not on, i.e., no drive voltage is applied to the tracking actuator 22 and the objective lens is positioned at a neutral position determined only by spring constant of the support system, the beam spot will be positioned at the center of the four split photo-detector 10 as shown in FIG. 3.

Due to change in the spring constant caused by aging, change in positions of optical component parts due to aging or inclined disposition of the disc playback device or the disc, the beam spot tends to be deviated from the center of the four split photodetector 10 as shown in FIG. 4 (this state will be called "off-center" hereinafter).

In the prior art circuit shown in FIG. 2, in which the feed motor 26 is controlled so that the dc component of the voltage applied to the tracking actuator 22 will be reduced to zero, the tracking error affects the feed servo. If there is off-center, the beam spot tends to converge in the four split photo-detector in a deviated state by the amount of this off-center component. This off-center component is superposed on the tracking error signal and is applied for the tracking servo. Incidentally, the feed servo is operating so that the dc component of the voltage applied to the tracking actuator 22 becomes zero. At this time, the off-center itself is not corrected. Namely, the off-center component exists in the tracking error signal with resulting deterioration in the quality of the tracking error signal and also decrease in the tracking efficiency due to deterioration in the tracking error signal. The deterioration in the tracking efficiency causes failure in introducing the servo state or results in taking undue long time in introducing the servo state when the mode is changed from a tracking-off mode to a tracking-on mode, for example in starting of playback of the disc or during search.

It is, therefore, an object of the invention to provide an optical pickup control device capable of controlling the beam spot in such a manner that the offcenter is corrected and the beam spot comes at the center of the four split photo-detector so that the quality of the tracking error signal will be improved with resulting improvement in the tracking efficiency.

SUMMARY OF THE INVENTION

The optical pickup control device achieving the above object of the invention is characterized in that a neutral position of the objective lens is controlled so that a left adjacent sum output and a right adjacent sum output of a four split photo-detector become equal to each other.

The optical pickup control device according to the invention comprises an optical pickup having a four split photo-detector receiving laser beam reflected from a disc pit, tracking servo means receiving two diagonal sum outputs of the four split photo-detector for performing tracking servo for the optical pickup, and neutral position control means receiving a left adjacent sum output and a right adjacent sum output of the four split photo-detector for correcting a neutral position of an objective lens so that these adjacent sum outputs become equal to each other.

According to the invention, the neutral position of the objective lens is controlled in such a manner that the left and right adjacent sum outputs become equal to each other independently of the tracking error signal so that the beam spot is constantly positioned at the center of the four split photo-detector with a result that the quality of the tracking error signal is improved and the tracking efficiency thereby is improved.

For controlling the neutral position of the objective lens in such a manner, a control may be made, as described in the following embodiment, so that a difference signal between the left and right adjacent sum outputs is used as a control signal in the feed servo system and the feed servo is controlled so that this difference signal is reduced to zero. Since, according to this method, the feed servo is controlled in such a manner that the left and right side adjacent sum outputs of the four split photo-detector become equal to each other, off-center is corrected and the beam spot comes constantly at the center of the four split photo-detector.

In one aspect of the invention, the difference signal between the left and right adjacent sum outputs of the four split photo-detector is applied to the tracking actuator in a state before starting of playback of a disc or during search when the tracking servo loop and feed servo loop are off. The beam spot therefore is controlled so that it comes at the center of the four split photo-detector in the state before starting of playback of the disc or during search with a result that the tracking servo and the feed servo are initiated easily and quickly when the tracking servo loop and the feed servo loop are switched on.

BRIEF DESCRIPTION OF THE DRAWINGS

In the accompanying drawings,

FIG. 2 is a block diagram showing a prior art radial direction control circuit using the heterodyne system for detecting a tracking error;

FIG. 3 is a diagram showing a state in which the beam spot is positioned at the center of the four split photo-detector;

FIG. 4 is a diagram showing a state in which the beam spot is off-center in the four split photodetector.

DESCRIPTION OF A PREFERRED EMBODIMENT

A preferred embodiment of the invention will now be described with reference to FIG. 1.

Figure 1:
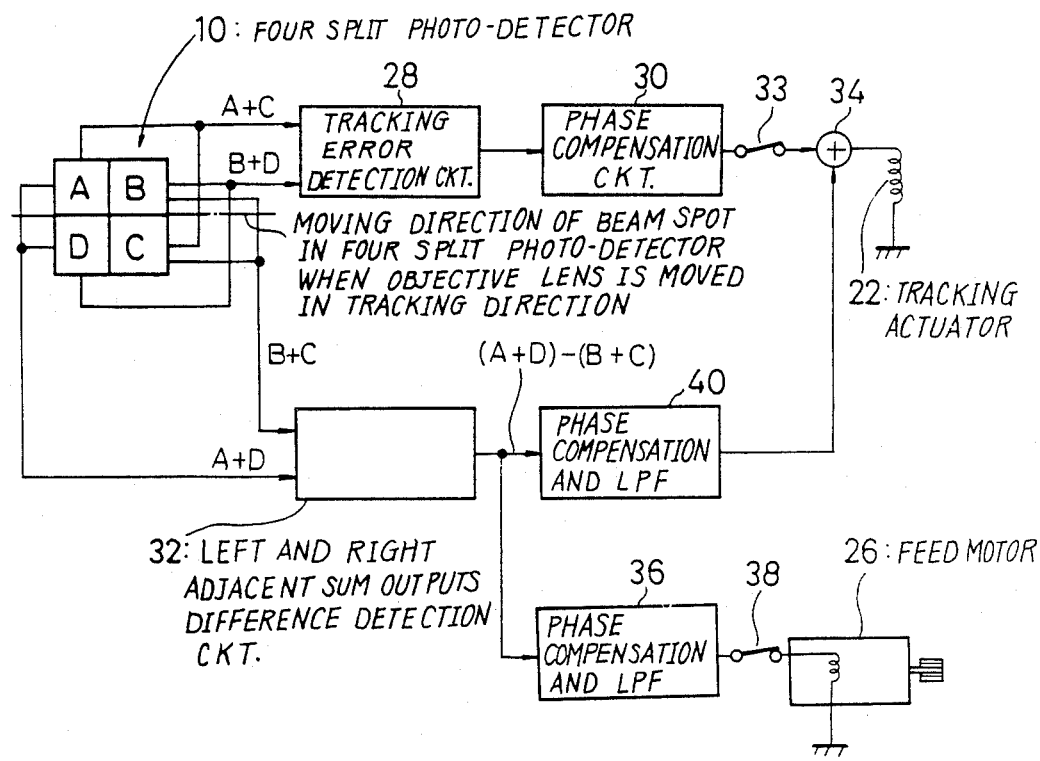
FIG. 1 is a block diagram showing an embodiment of the invention.

In FIG. 1, received laser beam signals on diagonals in a four split photo-detector 10 are added together. The sum outputs A+C and B+D are applied to a tracking error detection circuit 28 for detection of a tracking error. The detected tracking error signal is supplied to a tracking actuator 22 through a phase compensation circuit 30, a tracking servo on-off switch 33 and an addition circuit 34, whereby a normal tracking servo loop is formed.

The received laser beam signals in the four split photo-detector 10 are also added in such a manner that received laser beam signals in left and right adjacent positions are added together The sum outputs A+D and B+C are applied to a left and right adjacent sum outputs difference detection circuit 32 for detecting difference between left and right adjacent sum outputs. The difference signal detected by the circuit 32 is supplied to a feed motor 26 through a phase compensation and low-pass filter circuit 36 and a feed servo loop onoff switch 38 whereby a feed servo loop is formed.

The output of the left and right adjacent sum outputs difference detection circuit 32 is supplied to an addition circuit 34 through a phase compensation and low-pass filter circuit 40 and added to the tracking error signal in the addition circuit 34. The output of the addition circuit 34 is supplied to the tracking actuator 22.

According to the circuit shown in FIG. 1, when the on-off switches 33 and 38 of the tracking servo and feed servo loops are on, the tracking servo loop is controlled so that the tracking error signal is reduced to zero and the feed servo loop is controlled so that the difference between the left and right adjacent sum outputs $(A+D)-(B+C)$ is reduced to zero Accordingly, even if there is an off-center, the tracking actuator 22 and the feed motor 26 are controlled so as to correct the off-center with a beam spot being adjusted to come to the center of the four split photo-detector 10. At this time, to the tracking actuator 22 is applied, a voltage corresponding to the amount of correction of the off-center through the left and right adjacent sum outputs difference detection circuit 32, and the voltage corresponding to the amount of correction of the off-center in the output of the tracking error detection circuit 28 is zero.

In some state such as a state before starting of playback of a disc and during search, the on-off switches 33 and 38 of the tracking servo and feed servo loops are off. Since, at this time, the output $(A+D)-(B+C)$ of the left and right adjacent sum outputs difference detection circuit 32 is being applied to the tracking actuator 22, the beam spot is still held at the center of the four split photo-detector 10 and, accordingly, the tracking servo and feed servo can be introduced immediately upon turning on of the on-off switches 33 and 38 in starting of playback of the disc or ending of the search.

Figure 5:
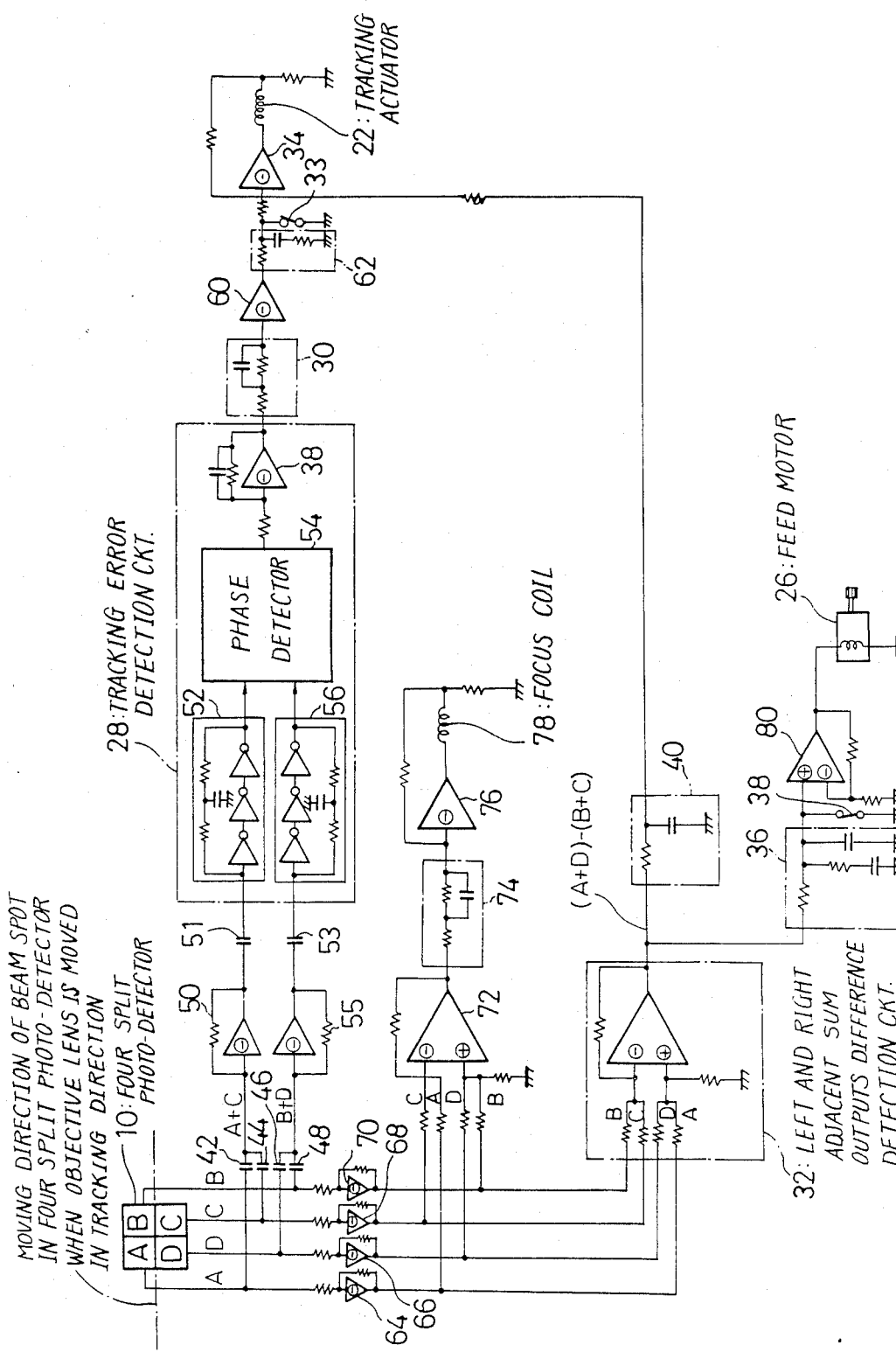
FIG. 5 is a circuit diagram showing a specific example of the embodiment shown in FIG. 1.

A specific example of the circuit of the embodiment of FIG. 1 is shown in FIG. 5. Received laser beam signals in the four split photo-detector 10 are applied to capacitors 42, 44, 46 and 48 for removing dc components therefrom and thereafter the received laser beam signals on diagonals are added together The sum signal A+C is applied to the tracking error detection circuit 28 through a buffer amplifier 50 and a capacitor 51. The sum signal B+D is applied to the tracking error detection circuit 28 through a buffer amplifier 55 and a capacitor 53. In the tracking error detection circuit 28, the applied sum signals A+C and B+D are applied to a phase detector 54 through waveshaping circuits 52 and 56.

The phase detector 54 detects a tracking error by a heterodyning method or a time difference detection method, utilizing the two inputs A+C and B+D. The detected tracking error signal is provided through a low-pass filter 58 and supplied through the phase compensation circuit 30, an amplifier 60, a low frequency boost component circuit 62, the tracking servo loop on-off switch 33 and the addition circut 34 to the tracking actuator 22.

The received laser beam signals of the four split photo-detector 10 are applied to a focus error detection circuit 72 through buffer amplifiers 64, 66, 68 and 70. In the focus error detection circuit 72, a focus error is detected by the operation $(B+D)-(A+C)$. The detected focus error signal is supplied through a phase compensation circuit 74 and an amplifier 76 to a focus coil 78.

The received laser beam signals of the four split photo-detector 10 are applied also to the left and right adjacent sum outputs difference detection circuit 32 through buffer amplifiers 64, 66, 68 and 70 for detection of the difference $(A+D)-(B+C)$ between the left and right adjacent sum outputs. The detected difference $(A+D)-(B+C)$ is supplied to the feed motor 26 through the phase compensation and low-pass filter circuit 36, the feed servo on-off switch 38 and an amplifier 80. The difference $(A+D)-(B+C)$ is applied also to the addition circuit 34 through a phase compensation and low-pass filter circuit 40 and added to the tracking error signal. The sum signal from the addition circuit 34 is supplied to the tracking actuator 22.

According to the construction of FIG. 5, when the on-off switches 33 and 38 of the tracking servo and feed servo loops are on (in FIG. 5, the contacts of swithces 33 and 38 are in open state), the tracking servo loop is controlled so that the tracking error signal is reduced to zero and the feed servo loop is controlled so that the difference $(A+D)-(B+C)$ between the left and right adjacent sum outputs is reduced to zero. Accordingly, even if there is an off-center, the tracking actuator 22 and the feed motor 26 are controlled to correct the off-center so that the beam spot is adjusted to come to the center of the four split photo-detector 10. At this time, to the tracking actuator 22 is applied a voltage corresponding to the amount of correction of the off-center through the left and right adjacent sum outputs difference circuit 32, and the voltage corresponding to the amount of correction of the off-center in the output of the tracking error detection circuit 28 is zero.

In some time such as a state before starting of playback of a disc and during search, the on-off switches 33 and 38 of the tracking servo and feed servo loops are off (in FIG. 5, the contacts of the switches 33 and 38 are in closed state). Since, at this time, the output $(A+D)-(B+C)$ of the left and right adjacent sum outputs difference detection circuit 32 is being applied to the tracking actuator 22, the beam spot is still held at the center of the four split photodetector 10 so that the tracking and feed servo loops can be introduced immediately upon turning on of the on-off switches 33 and 38 in starting of playback or ending of the search.

What is claimed is:

1. A control drive for use in an optical disc system having a laser, a photo-detector and a movable objective lens supported by a support system, light from the laser being reflected from a disc through the objective lens to the photo-detector, the objective lens having a neutral position determined by the support system which may not coincide with a desired neutral position in which the objective lens has a predetermined positional relationship with respect to the photo-detector, the control device comprising:

a tracking actuator for moving the objective lens;
   a tracking servo system for generating a tracking error signal for application to the tracking actuator; and
   a neutral position control means for generating a bias signal for application to the tracking actuator in addition to the tracking error signal, the bias signal having a value such that the objective lens will be located at said desired neutral position when the tracking error signal has a zero value.

2. An optical pickup control device for an optical disc system having a movable objective lens supported by a support system, wherein the objective lens has a neutral position determined by the support system, a control device comprising:

an optical pickup having a four split photo-detector for receiving a laser beam reflected from a disc through the objective lens;
   tracking servo means receiving two diagonal sum outputs of said four split photo-detector for performing tracking servo for said optical pickup by moving the objective lens; and
   neutral position control means receiving a left adjacent sum output and a right adjacent sum output of said four split photo-detector for controlling the position of the objective lens so that adjacent sum outputs become equal to each other to correct for error in said neutral position with respect to a desired neutral position.

3. An optical pickup control device as defined in claim 2 wherein the tracking servo means may be turned on and off and includes a tracking actuator for moving the objective lens, wherein said neutral position control means includes means for generating a difference signal between said left and right adjacent sum outputs and supplies said difference signal to the tracking actuator when said tracking servo is off.

4. An optical pickup control device as defined in claim 2 further including a feed motor for moving the optical pickup with respect to a disc, wherein said neutral positive control means servo-controls the feed motor and includes means for generating a difference signal between said left and right adjacent sum outputs for controlling the feed motor.

5. An optical pickup control device as defined in claim 4 wherein the tracking servo may be turned on and off and includes a tracking actuator for moving the objective lens and wherein said neutral position control device supplies said difference signal between said left and right adjacent sum objects to the tracking actuator when said tracking servo is off.

6. An optical pickup control device as defined in claim 4 wherein the optical pickup includes a tracking actuator for moving the objective lens and the tracking servo means generates a tracking error signal wherein said neutral position control means supplies to the tracking actuator a signal derived by superposing said difference signal between said left and right adjacent sum outputs on the tracking error signal.

7. An optical pickup control device as defined in claim 6 wherein the tracking servo means may be turned on and off and wherein said neutral position control means supplies said difference signal between said left and right adjacent sum outputs to said tracking actuator when said tracking servo is off.

* * * * *